Dec. 28, 1937.   P. J. WENTWORTH   2,103,884
COMPOSITION FOR SHOE MANUFACTURE AND PROCESS OF MAKING SHOES
Filed July 31, 1934

INVENTOR.
PEARL J. WENTWORTH.
BY Allen & Allen
ATTORNEYS.

Patented Dec. 28, 1937

2,103,884

UNITED STATES PATENT OFFICE 2,103,884

COMPOSITION FOR SHOE MANUFACTURE AND PROCESS OF MAKING SHOES

Pearl J. Wentworth, Fort Thomas, Ky.

Application July 31, 1934, Serial No. 737,811

16 Claims. (Cl. 106—23)

My invention relates broadly to a resilient insert or layer between the insole of a shoe and the outer sole thereof, to a particular composition for the purpose and to a method of manufacturing shoes. It has been the practice hitherto as is well known, to manufacture shoes by affixing an insole to a last and by attaching an upper to the insole thereon. Then it has been the practice to position, in some types of shoes, a resilient material over the insole or over a single portion or interspaced portions thereof, afterward attaching the outer sole so that the resilient material forms a cushion between the insole and the outer sole. For the most part the practice has been to use an insert of preformed material, although some attempts have been made to spread a resilient material such as cork particles in a binder over the insole. Neither of these procedures have hitherto been entirely without disadvantage. Many substances so used do not retain their resiliency, some of them disintegrate and many of them creep.

It is an object of my invention to provide a new substance for this use. It is an object of my invention to provide such substance initially in plastic form so that it may be formed into required inserts in a variety of ways. It is my object to provide a composition which will easily spread, is sufficiently elastic, permanently resilient, and not subject to creeping. It is an object of my invention to provide a substance which will be quite inexpensive and very economical to use. It is likewise an object of my invention to provide a novel procedure in the manufacture of shoes.

These and other objects of my invention I attain in that certain composition and by that process of which I shall now describe certain exemplary embodiments.

Figure 1:
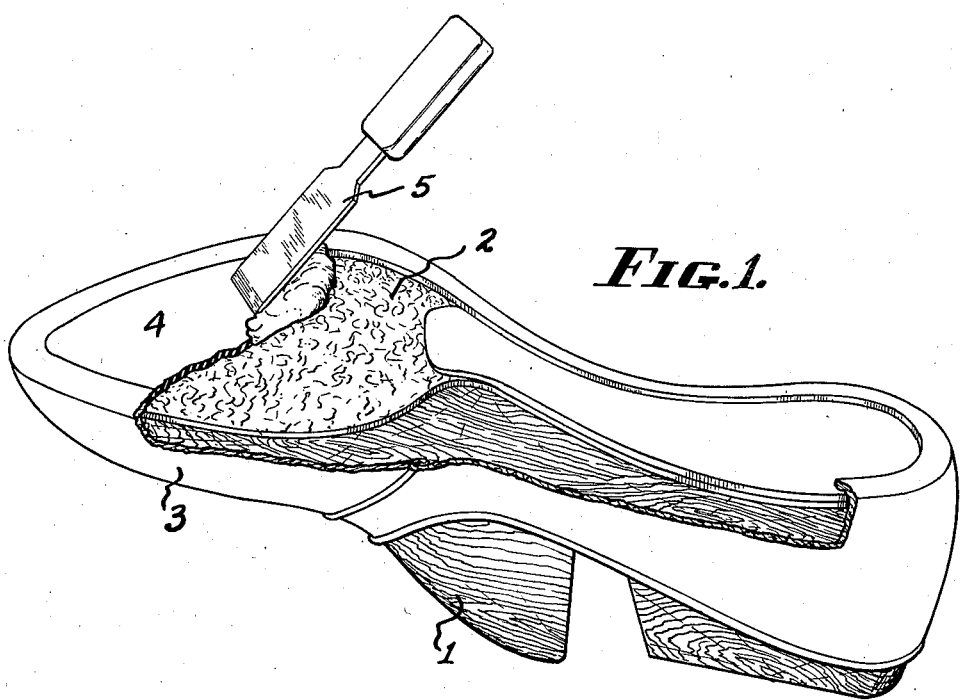
Figure 2:
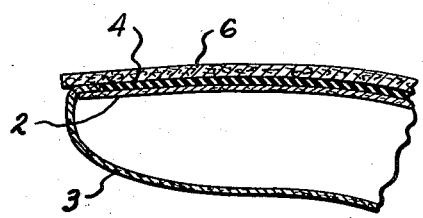

In the drawing I have shown, to illustrate one form of my process, a last with an insole and an upper thereon, and some of my composition being troweled into place to form an insert, in Figure 1. In Figure 2 I have shown a partial cross section of a completed shoe.

Essentially in the practice of my invention, I provide a composition comprising rubber as the binder in combination with a resilient filler material and a fibrous or spreading material of a particular kind. My composition is one in which a working plasticity is obtained by means of a solvent. Since compositions of this character are apt, upon evaporation of the solvent, to contract, and since in one aspect of my process such contraction, upon drying, would be highly undesirable, I preferably incorporate into my composition a portion of a material which prevents contraction upon drying without destroying resilience.

In the manufacture of my composition, I employ as a primary binder, a rubber solution or cut rubber. This may be of any well known type. I prefer to employ about a 9% solution of pure gum rubber in any of the commercial rubber solvents which are well known; but I am not limited thereto. For the filler material I may use any powdered or granular material, though preferably of resilient character, such for example as ground cork, but I prefer to employ ground up tire carcass, or other rubber waste which may, without harm and possibly with some advantage, contain some or all of the organic fiber with which the rubber was originally associated in the article. As the spreading ingredient I use a mineral fiber, preferably a rock or glass wool, usually obtained by spinning glass furnace slag or the like. After a mixing operation, the fibers become relatively short and they give a satisfactory body, while providing a composition which can be troweled smoothly in a relatively thin layer.

In making up my composition, by way of example but without limitation, I may take sixty-four ounces of the rubber solution, to which I add eight ounces of rock wool and thirty-four ounces of ground tire carcass, and I mix these ingredients together in a suitable mixing machine, say of the Werner-Pfleiderer type. The resulting composition is a plastic which may be placed in air tight cans or other containers until its use is required.

When used in the manufacture of shoes, this composition may be sheeted as by rolls or the like, or a troweling operation, and may be dried and cut into inserts of the required size.

It is preferable, for economy in manufacture however, to employ the composition as such in the manufacture of shoes. I have found that the composition for this purpose is very much improved by the addition of an ingredient which will prevent contraction upon drying without destroying elasticity or resilience. Such an ingredient may be in one of the natural gums of wax-like or bituminous substances dissolved in a solvent. I have found it preferable to use a gum known as niger gum dissolved in a fast naptha until a thin liquid is obtained. When manufacturing a composition in accordance with the formula given above, I prefer to add 18 ounces of the contraction preventing ingredient. Ordinarily it will be found preferable to mix the contraction preventing ingredient with the rubber solution first, afterward adding and mixing in the rock wool and finally mixing in the powdered or granular waste rubber material.

This composition does not contract upon drying and elimination of the solvent; consequently it may be troweled into place upon an insole without the necessity of halting the process of manufacture of the shoe until the material is dried, and afterward filling up the cracks left by the contraction thereof. I have shown in the drawing a last 1, to which an insole 2 is attached, and I have shown also the upper 3 in place. The edges of the upper lying over the edges of the insole leave a centrally depressed space as shown, into which my composition 4 may be troweled as by a knife 5. The composition may be troweled all over the insole, or over only a part thereof, or over interspaced toe and heel portions as may be desired. Applied before the solvent has evaporated, the composition makes a good bond with the insole and adjacent parts, and by reason of the fact that it does not contract upon drying, the manufacture of the shoe may continue in an uninterrupted manner. The outer sole 6 may be applied to the structure aforesaid, and when this is done prior to the drying of the solvent, an excellent adhesive bond is formed with the outer sole as well. The composition dries into a tough, tenacious, fairly elastic and very resilient mass, which is not subject to displacement or creeping.

Modifications may be made in my invention without departing from the spirit thereof, but what I claim as new and desire to secure by Letters Patent is:—

1. A shoe filler, comprising as a principal ingredient, ground-up tire carcass, a binder, a solvent therefor, and a contraction preventing material selected from a group consisting of the natural gums of wax-like or bituminous substances dissolved in a solvent.

2. A shoe filler, comprising as a principal ingredient, prevulcanized rubber granules existing as such, a binder, a solvent therefor, and a contraction preventing material selected from a group consisting of the natural gums of wax-like or bituminous substances dissolved in a solvent.

3. A shoe filler, comprising as a principal ingredient, ground-up tire carcass, a binder and a solvent therefor, and Niger gum.

4. A shoe filler, comprising as a principal ingredient, ground-up tire carcass, and an artificial mineral fiber, a binder and a solvent therefor, and a contraction preventing material selected from a group consisting of the natural gums of wax-like or bituminous substances dissolved in a solvent.

5. A shoe filler, comprising as a principal ingredient, prevulcanized rubber granules existing as such, and an artificial mineral fiber, a binder and a solvent therefor, and a contraction preventing material selected from a group consisting of the natural gums of wax-like or bituminous substances dissolved in a solvent.

6. A shoe filler for the purpose described including as a principal ingredient prevulcanized rubber granules existing as such, a binder and a solvent therefor, the quantity of the binder being so proportioned to the whole, that when the solvent is driven off the mass remains porous.

7. A shoe filler comprising rubber cement and artificial mineral fibre and ground-up tire carcass.

8. A shoe filler comprising rubber cement, mineral wool and ground-up tire carcass.

9. A shoe filler comprising rubber cement, rock wool and ground-up tire carcass.

10. A shoe filler comprising rubber cement as a continuous binder, ground-up tire carcass as a filler material and a contraction preventing material selected from a group consisting of the natural gums of wax-like or bituminous substances dissolved in a solvent.

11. A shoe filler comprising rubber cement, rock wool, ground-up tire carcass and a contraction preventing material selected from a group consisting of the natural gums of wax-like or bituminous substances dissolved in a solvent.

12. A shoe filler described in claim 8 containing an organic gum as a contraction preventing agent.

13. A shoe filler described in claim 9 containing an organic gum as a contraction preventing material.

14. A shoe filler comprising rubber cement as a binder, ground-up tire carcass as a filler material and Niger gum as a contraction preventing material.

15. A shoe filler for the purpose described comprising a rubber cement binder, a granular resilient filler and an artificial mineral fibre of smooth character, to give body to the mass and to facilitate smooth spreading as by troweling and quick drying.

16. A shoe filler for the purpose described comprising a rubber cement binder, a granular resilient filler and an artificial mineral fibre of smooth character to give body to the mass and to facilitate smooth spreading as by troweling and quick drying, said resilient filler comprising ground tire carcass.

PEARL J. WENTWORTH.